Aug. 28, 1951 H. B. WHITE 2,566,275
SUCTION CLEANER BAG
Filed Sept. 30, 1949 2 Sheets-Sheet 1

INVENTOR.
Harry B. White
BY
ATTORNEY.

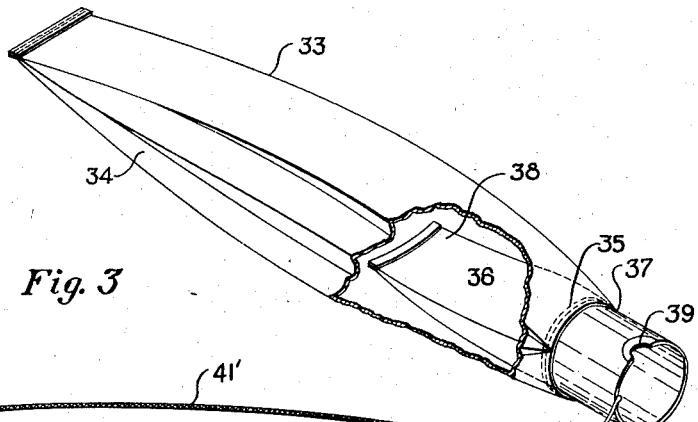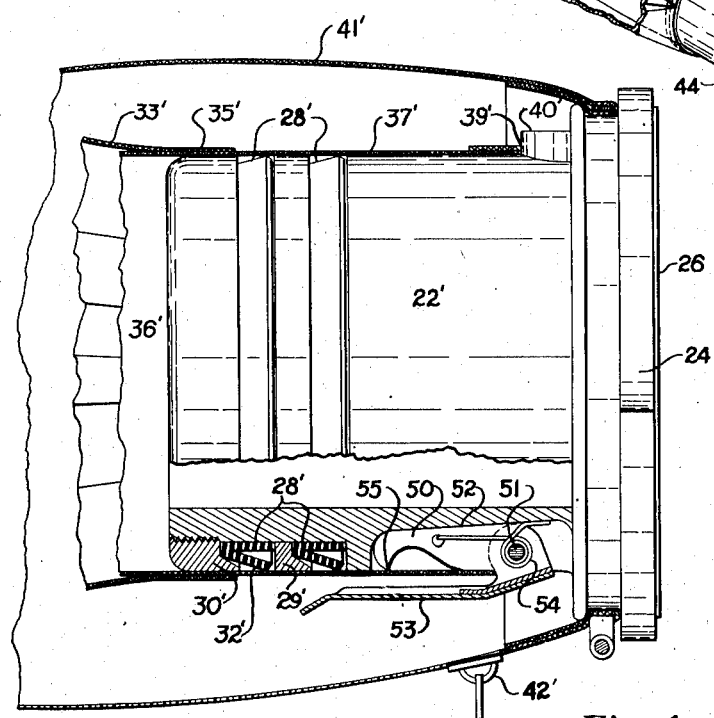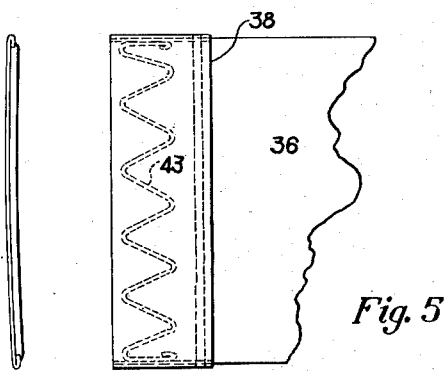

Patented Aug. 28, 1951

2,566,275

UNITED STATES PATENT OFFICE 2,566,275

SUCTION CLEANER BAG

Harry B. White, Canton, Ohio, assignor to The Hoover Company, North Canton, Ohio, a corporation of Ohio Application September 30, 1949, Serial No. 118,795

20 Claims. (Cl. 183—51)

1

The present invention relates to suction cleaners in general and more particularly to a novel filter and filter coupling.

Paper filters are preferable to cloth filters in many respects chief among which are their low cost, high efficiency and greater tendency to shed dirt as the air passes through the walls thereof. To retain these advantages commercially, it is essential to keep the construction as simple as possible and to provide a cheap, easily operated and effective coupling between the filter and the exhaust air passage of the cleaner. This end is achieved in a most efficacious manner by the present invention. Thus, a very simple filter bag is constructed from sheet paper stock having a neck or inlet opening of a predetermined size. This neck is designed to telescope over an adapter at the extremity of the cleaner exhaust passage and to be firmly retained thereon by an automatic grip and seal which will not release the neck until it is destroyed by tearing or otherwise. Hence, once in place, the filter remains sealed to the cleaner until it is no longer fit for use. A simple mutilating device can then be operated to tear the neck of the filter thereby releasing it for removal and replacement by a new filter.

Another important feature of the invention is the fact that all the dirt and foreign material picked up by the cleaner is delivered to the novel filter where it is effectively trapped and sealed. Even during removal of the filter, all dirt is retained in the sealed, sanitary filter which, due to its unusually inexpensive construction, can be disposed of without breaking the seal. Moreover, these advantages are realized despite the fact that the filter neck is destroyed as an incident of its removal from the cleaner.

Heretofore, the practice has been to re-use paper filters a number of times by emptying the dirt and replacing them on the cleaner. This has been done even in the case of very inexpensive paper filters and despite the contrary instructions furnished by the manufacturer. As a result, owners have continued to use the filter until it fails. In consequence, the room is blown full of fine dust, the appearance envelope becomes filled with dirt and the housewife is confronted with a most distasteful task. Moreover, she is likely to condemn the manufacturer and his product unjustifiably.

The present invention avoids this unfortunate possibility by so making the adapter and the filter that the latter cannot be emptied or re-used. This is accomplished by the employment

2 of a clamp necessitating the partial destruction of the filter inlet to remove the bag from the cleaner and by making it impossible to empty the filter without destroying it. In this way assurance is had that the use of the filter is confined to a period well within the safe life limits of the filter construction materials.

Accordingly, it is an object of the invention to provide a suction cleaner with a simple, low cost, and highly effective coupling between the cleaner exhaust and the filter bag.

Another object is the provision of novel means for removing a filter from a suction cleaner.

A further object is the provision of a filter so constructed that it cannot be emptied or re-used.

Still another object of the invention is the provision of a new and improved self-acting coupling for a suction cleaner filter.

Yet another object is the provision of an inexpensive, self-sealing, sanitary filter one portion of which is destroyed in removing the filter from the cleaner without breaking into the sealed, dirt-containing portion of the filter.

A further object of the invention is the provision of a new, low cost, disposable filter.

These and other objects will be readily apparent upon reading the following specification and claims and considering the drawings to which they relate.

Figure 3 is a perspective view of the filter with parts broken away to show the self-sealing valve;

Figure 4 is a view through a modified embodiment of the adapter; and

Figure 5 is a side and an end view of the filter valve construction.

Figure 1:
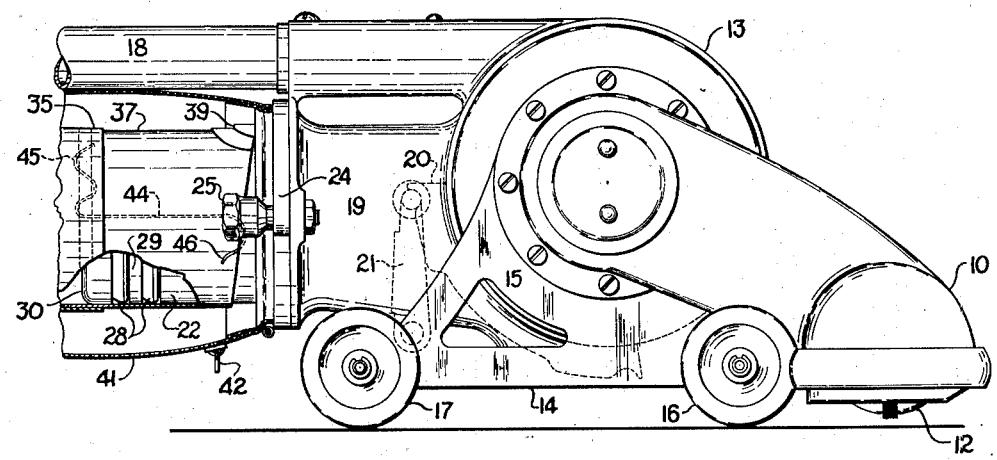
Figure 1 is a side view partly in section of a suction cleaner incorporating the invention.

The invention is shown as applied to a suction cleaner of the floor type having a suction nozzle 10 extending crosswise of its forward portion. Preferably, the nozzle is provided with a power driven rotary agitator 12 having bars which beat the carpet and brushes which whisk the dirt and litter into the air stream. Pivotally mounted on a horizontal axis at the upper end of the suction air passage is a motor-fan unit 13. A supporting carriage 14 has upwardly extending brackets 15 which support the nozzle casting and the opposite ends of the motor-fan unit in a combined bearing and air seal construction of well known design as, for example, that shown in United States Patent 2,130,513 to Smellie. The suction fan has an inlet eye which communicates with nozzle 10 by means of an air passage extending through the bearing and seal construction. Carriage 14 is provided with forward and rear supporting wheels 16 and 17.

Extending tangentially from the upper side of the motor-fan unit is the usual cleaner propelling handle 18. The upper end of this handle is not shown since its construction details are not material and may be of any desired type. An exhaust air conduit 19, shown as formed integrally with the motor-fan unit 13, extends parallel to the handle immediately therebelow and communicates with the suction fan outlet. The under side of the motor unit is provided with a handle control sector 20 having indentations which cooperate with a pivoted, spring-biased, roller detent pawl 21 to hold the handle in several positions in accordance with well known practice in the suction cleaner art.

The filter assembly comprises an adapter tube 22 of die cast or molded plastic construction. This adapter has a central passageway 23 forming an extension of the exhaust air conduit 19. The opposite sides of the forward end of the adapter are provided with lugs 24 which cooperate with thumb nuts 25 to secure the adapter in place over the end of exhaust passageway 19. A sealing gasket 26 insures an airtight fit between the adapter and the exhaust passageway. It will be understood that adapter 22 may be integral with conduit 19 in the interest of greater simplicity and economy.

Figure 2:
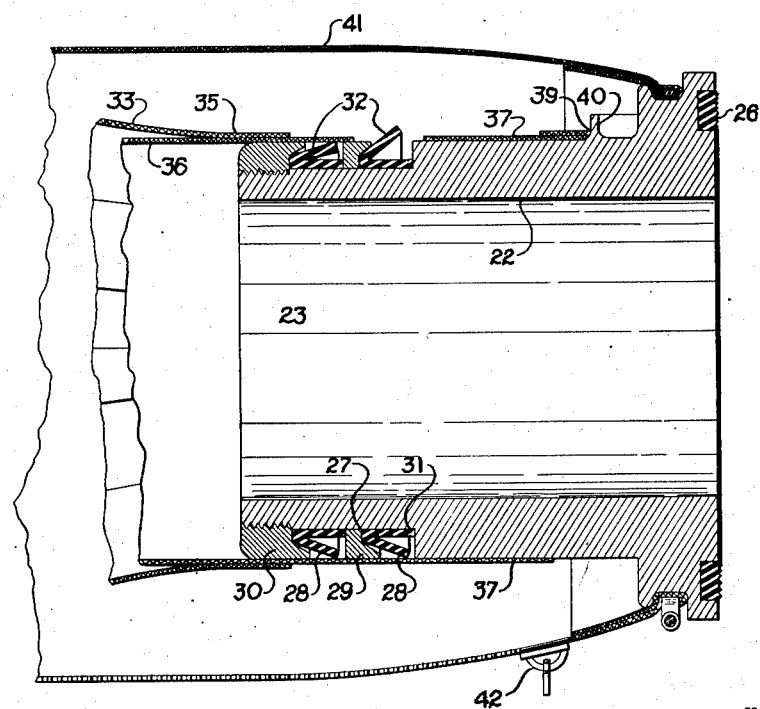
Figure 2 is an enlarged sectional view taken through the filter adapter.

The outer peripheral end of the adapter is cut away at 27 to receive a pair of V-shaped flexible rubber gaskets 28—28. These gaskets are held spaced apart by a spacer ring 29 of the shape shown in Figure 2 while a similarly shaped threaded lock ring 30 holds the two gaskets 28 and spacer ring 29 assembled on the adapter. While a pair of self-acting clamping gaskets has been shown, it is to be understood that one has been found adequate in practice. Two or more provide greater assurance against accidental uncoupling and permit the use of lighter and more flexible design of the individual gaskets.

The sealing gaskets 28 will be observed to comprise an inner ring 31 which tightly embraces the adapter tube and a normally outwardly flaring skirt portion 32 having its waist portion formed integrally with the inner ring 31. In fact, the waist portion may be considered as including seating ring 31. The normal position of the skirt with the filter removed is as shown in the cut away portion at the top of Figure 2. However, when the neck or inlet end of the filter bag is seated upon the adapter, the skirt is compressed inwardly. The resiliency and tendency of the skirt to maintain its normal position causes it to press outwardly against the inner wall of the filter neck with such a strong and positive gripping action as to prevent withdrawal of the filter. Any tendency of the skirt to buckle is counteracted by support on the outer surface of the skirt provided by the inclined adjacent surfaces of rings 29 and 30.

Referring to Figure 3, it will be seen that the filter bag 33 comprises a generally tubular paper envelope whose opposite side portions may be fluted as indicated at 34 to facilitate collapse of the bag when not in use and as an aid to compact packaging and shipping. The upper end of the filter is turned over and sealed in the most inexpensive and expeditious manner possible such as by pasting or stitching. The lower end of the filter cylinder is gathered and firmly sealed at 35 to an intermediate point along the relatively small diameter, tough paper tube 36. The exposed end 37 of tube 36 constitutes a destroyable seating and inlet for the filter, while its upper end 38 constitutes a self-closing valve which will be described in greater detail below. Exposed end 37 of tube 36 has a diameter slightly greater than the external diameter of adapter 22 so as to telescope over the adapter easily. However, its internal diameter is appreciably less than the normal expanded diameter of the self-locking and clamping skirts 32—32 of rings 28—28.

The end of tube 37 may be notched at 39 to interlock with a locater 40 projecting from the base of adapter 22. Thus, notch 39 and locater 40 serve as a guide for the placement of the filter upon the adapter so that flutes 34 in the bag may be positioned at the sides. This location facilitates compact storage of the cleaner when not in use.

An appearance envelope 41 of cloth or other suitable material encloses filter 33 and adapter 22. This envelope is preferably secured to the base of adapter 22 by a suitable ring fastener while its upper end is supported from the under side of the cleaner handle 18 in the usual manner. Access to the interior of envelope 41 is gained by opening a hookless slide fastener 42 on the under side of the envelope.

The construction of the self-sealing valve 38 will be better understood by reference to Figure 5. From this showing it will be noted that one-half of the periphery of the valve of the paper cylinder contains a zig-zag shaped light wire spring 43. This spring is held in place against one side by folding the end of the tube over to enclose the spring. Since the spring tends to expand, it will push the opposite sides of tube 36 apart until the end of the tube is flattened and closed. Thus, normally spring 43 holds the valve 38 firmly closed. However, the valve readily opens under the exhaust pressure created by the suction fan and allows the dirt-laden air stream to enter the filter so long as the motor and fan are operating.

The self-locking rings 28—28 are so effective in locking inlet 37 of the filter to the adapter tube that it is impossible to remove it for the replacement of the filter. To enable the operator to replace the filter easily and conveniently when it becomes filled with dirt, I have provided the preferred embodiment of the invention with a simple and effective means for destroying the seat and inlet 37. This means comprises a rip-cord 44 extending lengthwise along the inner side wall of inlet 37. Its innermost end 45 preferably extends circumferentially and is firmly anchored to inlet 37 as by being interlocked with the stitching holding the body portion of filter 33 to tube 36. The intermediate portion of the rip-cord may be held in place on the inner wall of inlet 37 by gluing or other equivalent means. The outer end 46 of the rip-cord hangs free where it can be grasped by the operator and pulled backwardly to sever the neck lengthwise to a point above the outermost clamping ring 28 but not so far as to puncture the enclosed portion of tube 36 or the side wall of the filter proper.

Accordingly, it will be readily apparent that while I provide means for severing and destroying the seating inlet of the filter, I do not break into the filter proper which remains tightly sealed against the escape of dirt and dust. The destruction of inlet 37 quickly releases the filter from the adapter and, in addition, provides a positive safeguard against re-use of the filter. Moreover, the housewife is relieved of the irksome and unsanitary task of emptying the filter which would be unavoidably attended by the release of much dust to the air and heavier particles to the floor. The sealed filter can be compactly folded and left in the waste paper basket without the likelihood that the later discharge of other waste into the basket will scatter or release dirt into the room. On the other hand, the filter may be laid aside or taken directly to some point of disposal without danger of leaving a trail of dirt and without the necessity of careful handling as would be required with existing types of filters.

Referring now to the second embodiment of the invention illustrated in Figure 4, it will be noted that similar elements are designated by the same numeral as in the first embodiment distinguished by a prime. Substantially the only difference between the two embodiments is the substitution of a mechanical severing device for rip-cord 44.

The severing mechanism comprises a cutter blade 50 pivotally mounted by pin 51 in a slot 52 extending lengthwise of adapter 22' at a point below clamping rings 28'—28'. The operating lever 53 is rigidly secured to the knife blade and is normally held in the retracted position shown in Figure 4 by a torsion spring 54. In this position, handle 53 is spaced from the side wall of the adapter tube sufficiently to permit the ready insertion of a filter neck 37' over the adapter. Preferably, the tip of the knife blade is formed with a piercing point 55. Thus, when the operating handle is pivoted downwardly about pin 51, point 55 pierces the wall of tube 37' and then slits the tube downwardly as the knife blade is pivoted outwardly. The operator then grasps one of the corners of the slit tube and tears the tube upwardly to a point just above the outermost clamping ring 28'. The destruction of the filter neck in this manner releases the filter from the adapter without, however, breaking into the sealed, dirt-containing portion of the bag. Tearing of inlet 37' to a point terminating immediately above the uppermost clamping ring 28' is insured by the stitching or glue employed to seal the main body of filter 33' to tube 36'.

*Operation*

The operation of the complete assembly is considered obvious from the foregoing but will be reviewed in brief for purposes of a fuller understanding of the invention and its many advantages. Let it be assumed that the cleaner is assembled as indicated in Figure 1. Operation of the motor causes a dirty air stream to pass upwardly through the nozzle and into the fan eye. This stream, discharging from the fan under pressure, passes through conduit 19 and passage 23 of adapter 22. The pressure of the stream opens valve 38 against the closing action of spring 43. The dirt separated as the air escapes through the porous filter paper falls to the bottom of the filter and collects in the space surrounding the enclosed portion of tube 36.

When a sufficient quantity of dirt has been collected, the filter should be replaced by a new one and this can be accomplished very quickly and in a sanitary manner. The propelling handle is preferably elevated to its vertical storage position where it is held by handle control elements 20 and 21. Appearance envelope 41 is then opened by sliding hookless fastener 42 upwardly. Next, end 46 of rip-cord 44 is pulled upwardly severing inlet 37. This severing immediately releases the filter from adapter 22 without, however, interfering with the sealed condition of the filter. It will be understood that the sole inlet to the filter is closed automatically by valve 38 as soon as the motor-fan unit is deenergized. The filter may now be folded as compactly as its dirt content will permit or laid to one side without folding. In either event, there is no danger of dirt or dust leaking from the bag since it is tightly sealed; and this is true even though a portion of the filter, i. e. inlet tube 37, is destroyed in removing the filter from the adapter.

As inlet 37 is severed, skirts 32 of clamping rings 28 flare outwardly by reason of their construction and internal stresses. Excessive outward flaring is arrested by the shape of the adjacent walls of rings 29 and 30.

The placement of a new filter is even simpler than the removal of a dirt filled one. The inlet of a fresh filter is telescoped over the end of the adapter with notch 39 in alignment with locater 40. As the inlet telescopes over the adapter, skirts 32 of the clamping rings are easily and readily depressed. However, any tendency to remove the filter either by a direct mechanical pull upon it or as the result of the fan pressure on the interior thereof causes the skirt 32 to expand outwardly into tighter gripping action upon the interior of the filter neck. Excessive bulging of the skirts is eliminated by the supporting action afforded by the adjacent flaring walls of rings 29 and 30.

Ordinarily it is not necessary to support the upper end of the paper filter in any manner since the supporting action of the closing envelope 41 has been found entirely sufficient and satisfactory. However, if desired, the top end of the filter may be attached to the handle through a spring or other supporting connection. As soon as the hookless fastener 42 has been closed, the cleaner is ready for return to cleaning duty.

The operation of the second embodiment illustrated in Figure 4 is very similar to that just described. The only difference is that instead of pulling upon a rip-cord, the user grasps handle 53 and rotates knife blade 50 downwardly upon its pivot 51 to slit the lower end of inlet 37'. The operator then grasps one corner of the severed tube and pulls upwardly severing the inlet to a point above the uppermost clamping ring 28'. As was true of the preferred embodiment, the resultant destruction of the filter inlet in this manner does not puncture or otherwise create an opening in the dirt containing portion of the filter.

A new filter is placed upon the modified adapter in the same manner as described above in connection with the first embodiment.

From the foregoing, it will be manifest that the present invention provides an unusually simple, low cost cleaner construction. Not only does it have a minimum number of simple parts to operate, but it is designed to employ the simple and economical filter forming an important part of the present invention. This novel filter is so designed that it cannot be re-used after it becomes filled with dirt. Moreover, it is completely sanitary and is readily and conveniently disposable in a variety of ways none of which involves the likelihood of dirt spillage or the escape of dust into the room.

While I have shown and described two embodiments of my invention, it is to be understood that these are to be taken as illustrative only and not in a limiting sense. I do not wish to be limited to the particular structures shown and described, but to include all equivalent variations thereof except as limited by the scope of the claims.

It is to be understood that the protection herein applied for is not confined to the particular combinations of features or elements set out in the following claims. Protection is herein applied for for any one or more of the features or elements referred to in the following claims, or described in the foregoing specification or shown in the accompanying drawings, either independently or in combination.

I claim:

1. In combination with a suction cleaner of the type having a suction nozzle, a motor driven suction fan, a propelling handle pivotably connected to said cleaner, said cleaner being characterized by the provision of a filter adapter conduit movable with said handle and communicating with the exhaust side of said suction fan, said adapter having self-acting clamping means therearound operable to permit the telescoping of a filter inlet thereover readily and to grip said inlet firmly against withdrawal of said filter, a filter having an inlet adapted to be gripped and held in place by said clamp means, and means for severing said filter inlet to release it from said adapter.

2. The combination defined in the preceding claim including means carried by said filter inlet for severing the inlet when it is desired to remove the filter from said adapter.

3. The combination defined in claim 1 including means mounted on said cleaner operable to sever said filter neck to release the filter from said adapter.

4. A filter adapter for the exhaust outlet of a suction cleaner comprising a tubular conduit, flexible, resilient means encircling said adapter below its discharge end, said flexible means constituting a self-acting clamp for the inlet end of a filter adapted to be seated upon said adapter, said clamp including a filter gripping means having a normal perimeter greater than that of a filter inlet, said gripping means being arranged to be compressed inwardly by a filter inlet as it is telescoped over the discharge end of said adapter and to grip said inlet firmly when the filter tends to move in the reverse, and means for severing the filter inlet when it is desired to remove the same from said adapter.

5. A filter adapter as defined in the preceding claim in which said self-acting clamp comprises a plurality of spaced apart filter gripping means.

6. A filter adapter as defined in the preceding claim in which said self-acting clamp comprises a plurality of rings having outwardly flaring skirts, said skirts having waist portions mounted on said adapter and free rim portions operable to grip the inner surface of a filter inlet inserted thereover from the waist end of said skirt.

7. A filter adapter for the exhaust outlet of a suction cleaner, comprising a conduit, a self-acting clamp mounted on the exhaust end of said conduit, said clamp including a plurality of independent, resilient, outwardly flaring skirts, each skirt having a waist closely embracing said adapter and a free rim operable to grip the inner surface of a filter inlet, and means to limit outward flaring movement of said skirts and to reinforce said skirts when forces are applied tending to withdraw a filter from said adapter.

8. In combination with a suction cleaner, a filter adapter having a self-acting, expanding filter clamp operable to expand against the inner surface of a filter neck to lock the filter in place on said adapter, a paper filter bag closed except at its inlet end, said inlet end having a perimeter permitting it to be telescoped over said adapter and to be gripped by said expanding clamp, said clamp including flexible wall members arranged to collapse readily as said filter inlet is telescoped thereover in the placement of said filter on said adapter and to expand against the inside of said inlet and firmly grip the same immediately upon a slight withdrawal movement of said filter inlet an automatic valve connected to said filter inlet which opens under the exhaust pressure of said cleaner and closes when said cleaner is de-energized, and means for severing said filter inlet to release it from said adapter.

9. The combination defined in the preceding claim characterized in that said severing means is arranged to restrict the severing of said filter inlet to the portion thereof exterior to the body of said filter sealed by said automatic valve whereby the severing of said filter inlet is accomplished without breaking into a dirt containing wall of said filter.

10. A paper filter for use on a suction cleaner comprising a bag-like paper envelope closed except for an inlet opening, a self-closing valve sealed to said filter adjacent and in communication with said inlet, said inlet comprising a tubular member extending outwardly beyond said sealed connection between the filter and said valve to provide a filter seating and clamping connection with the exhaust of a suction cleaner, said tubular member being constructed and adapted to be severed and destroyed during the removal thereof from a suction cleaner adapter, and said sealed connection between said filter and said valve being located between the body of said filter and the seating and clamping connection therefor and providing a reinforced wall which is not easily severed whereby the filter seating and clamping portion of said tubular member may be severed and destroyed in removing the same from a suction cleaner adapter provided with a self-acting expanding clamp without danger of severing a dirt containing wall of said filter.

11. A paper filter as defined in the preceding claim including means carried by said filter for severing said tubular member to release the filter from a suction cleaner and to prevent its re-use thereon.

12. A non-reusable filter for use on a suction cleaner comprising an air-pervious, dirt and air separating body formed from paper stock, said body having an opening sealed about a tubular member intermediate the ends thereof, self-closing valve means on the inner end of said tubular member to maintain the same closed and operable to open in response to the exhaust pressure of a suction cleaner, the exposed end of said tubular member exteriorly of said filter body being formed to telescope over the exhaust end of a suction cleaner adapter and to be firmly clamped thereto by an expanding type clamp on said adapter, the exposed end of said tubular member being constructed and adapted to be severed lengthwise thereof to release the filter from a suction cleaner adapter, and said sealed connection between the opening in the body of said filter and the intermediate portion of said tubular member providing a reinforced wall section which resists severing and prevents the lengthwise sever made in said tubular member from extending through said reinforced wall section into a dirt containing wall of said filter.

13. A filter as defined in the preceding claim having a rip cord secured to the exposed end of said tubular member operable to sever the same to release the filter from a suction cleaner adapter.

14. A filter mounting adapter for the exhaust outlet of a suction cleaner comprising a tubular member, self-acting filter clamping means mounted on the exhaust end of said adapter, said clamping means being operable to collapse inwardly under the pressure of a filter inlet when telescoped downwardly over the exhaust end of said adapter and to thereafter expand against the inner surface of a filter inlet to clamp it firmly on said adapter, and means on said adapter for severing said filter inlet to release it from said clamping means.

15. A filter mounting adapter as defined in the preceding claim in which said severing means includes a pointed member operable to puncture said inlet and thereafter slit the inlet progressively from said point of puncture.

16. A filter adapter for the exhaust outlet of a suction cleaner comprising a tubular conduit, flexible, resilient means encircling said adapter below its discharge end, said flexible means constituting a self-acting clamp for the inlet end of a filter adapted to be seated upon said adapter, said clamp including a filter gripping means having a normal perimeter greater than that of a filter inlet, said gripping means being constructed and arranged so as to move inwardly easily and with the application of a relatively light force as said filter inlet is telescoped downwardly thereover and to grip the interior wall of said inlet firmly and with a relatively large force under stresses tending to move a filter inlet in the reverse direction, and means for destroying a filter inlet to release it from the gripping action of said self-acting clamp.

17. A non-reusable paper filter comprising a body portion closed except for a dirty air stream inlet opening, tubular means secured to said inlet opening and adapted to be secured to a suction cleaner adapter having an expanding type clamping means for mounting said filter to said adapter, and means carried by said filter for destroying said tubular means so that it cannot be secured to an adapter by an expanding type clamping means.

18. A non-reusable paper filter as defined in the preceding claim having means thereon for severing said tubular means opposite a clamp gripping portion thereof.

19. A non-reusable paper filter as defined in claim 17 in which said tubular means extends into the interior body portion and cooperates with the adjacent walls of said filter to provide a dirt trap, and a self-closing valve mounted in said tubular means operable to open in response to the discharge pressure of a suction cleaner.

20. In combination with a suction cleaner, a propelling handle pivoted to said cleaner, a filter adapter movable with said handle and connected with the discharge outlet of a suction creating means on said cleaner, a non-reusable paper filter closed except for an inlet opening, an expanding filter clamp for said filter inlet carried by the exhaust end of said filter adapter, self-closing valve means carried by said filter at said opening, and means for destroying said inlet opening without severing a dirt containing wall of said filter to release the filter from said adapter whereby said filter cannot be re-mounted on said adapter.

HARRY B. WHITE.

REFERENCES CITED

The following references are of record in the file of this patent:

UNITED STATES PATENTS

| Number | Name | Date |
| --- | --- | --- |
| 1,999,826 | Snell | Apr. 23, 1935 |
| 2,003,720 | Meek | June 4, 1935 |
| 2,317,569 | Weaver | Apr. 27, 1943 |